United States Patent [19]
Marking et al.

[11] Patent Number: 5,900,188
[45] Date of Patent: May 4, 1999

[54] YTTRIUM TANTALATE X-RAY PHOSPHORS WITH REDUCED PERSISTENCE

[75] Inventors: Gregory A. Marking; Vaddi Butchi Reddy, both of Sayre; Kenneth T. Reilly, Towanda, all of Pa.

[73] Assignee: Osram Sylvania Inc., Danvers, Mass.

[21] Appl. No.: 08/935,654

[22] Filed: Sep. 23, 1997

[51] Int. Cl.⁶ ..................................................... C09K 11/78
[52] U.S. Cl. ..................................................... 252/301.4 R
[58] Field of Search ....................................... 252/301.4 R

[56] References Cited

U.S. PATENT DOCUMENTS

| | | | |
|---|---|---|---|
| 4,225,653 | 9/1980 | Brixner | 428/539 |
| 4,929,385 | 5/1990 | Reddy | 252/301.4 R |
| 4,938,890 | 7/1990 | Reddy | 252/301.4 R |
| 4,959,174 | 9/1990 | Nakajima et al. | 252/301.4 R |
| 5,009,807 | 4/1991 | Reddy | 252/301.4 H |
| 5,112,524 | 5/1992 | Reddy et al. | 252/301.4 R |
| 5,380,463 | 1/1995 | Reddy et al. | 252/301.4 R |

*Primary Examiner*—Melissa Bonner
*Attorney, Agent, or Firm*—Robert F. Clark

[57] ABSTRACT

A composition and method are provided for reducing the persistence of yttrium tantalate x-ray phosphors having the monoclinic M' structure. Persistence is reduced by incorporating a tungsten additive into the phosphor. The phosphor preferably contains at least about 4 ppm W. The method for incorporating the tungsten additive consists of adding a tungsten containing compound to the mixture of raw materials formulated to make the phosphor and firing the mixture at a temperature and for a time sufficient to form the phosphor.

27 Claims, No Drawings

YTTRIUM TANTALATE X-RAY PHOSPHORS WITH REDUCED PERSISTENCE

TECHNICAL FIELD

This invention relates to yttrium tantalate x-ray phosphors. More particularly, it relates to reducing the persistence of yttrium tantalate x-ray phosphors.

BACKGROUND ART

Monoclinic M' yttrium tantalate x-ray phosphors are used in x-ray intensifying screens for medical radiographic applications. The x-ray screens are used in combination with x-ray films to produce x-ray images. Yttrium tantalate, $YTaO_4$, based phosphors are desirable for use in x-ray screens because they have a higher x-ray stopping power than other conventional x-ray phosphors and the major emission peak from $YTaO_4$, approximately 340 nm, overlaps favorably with the sensitive regions of certain commercial x-ray films. Examples of these phosphors are given in U.S. Pat. Nos. 5,009,807, 5,112,524, and 4,225,653 which are incorporated herein by reference.

One property associated with x-ray phosphors which can cause serious problems is the presence of delayed fluorescence. Delayed fluorescence is the emission of light from the phosphor after x-ray excitation stops. Persistence is the amount of delayed fluorescence exhibited by x-ray phosphor powders. A high persistence x-ray phosphor can compromise the quality of radiographic images collected using an x-ray screen made with that phosphor. This is a particular concern for x-ray intensifier screens used in automated changers for routine x-ray procedures. Because an intensifier screen in an automated changer is used many times over a short period of time, a high persistence phosphor can cause the screen to retain some of the previous image which will interfere with subsequent x-ray images taken with the same screen. Thus, it has become increasingly important to manufacture x-ray phosphors having the lowest possible persistence levels in order to obtain high quality radiographic images. Unfortunately, monoclinic M' yttrium tantalate phosphors commonly are afflicted with high persistence levels.

Thus, it would be an advantage to have monoclinic M' yttrium tantalate x-ray phosphors having reduced levels of persistence.

SUMMARY OF THE INVENTION

It is an object of the invention to obviate the disadvantages of the prior art.

It is another object of the invention to provide yttrium tantalate x-ray phosphors having reduced persistence.

It is further object of the invention to provide a method for reducing the persistence of yttrium tantalate x-ray phosphors.

In accordance with one aspect the invention, there is provided a monoclinic M' yttrium tantalate x-ray phosphor having an amount of tungsten to reduce persistence.

In accordance with another aspect of the invention, there are provided monoclinic M' yttrium tantalate x-ray phosphors having reduced persistence and the general formula

where $0 \leq x \leq 0.20$, $0 \leq y \leq 0.10$, $0 \leq z \leq 0.20$, and the amount of tungsten is at least 4 ppm by weight.

In accordance with a further aspect of the invention, there is provided a method for reducing the persistence of monoclinic M' yttrium tantalate x-ray phosphors involving incorporating a tungsten additive into the phosphor. More particularly, the method includes making a mixture of raw materials formulated to make the phosphor, adding an amount of a tungsten containing compound to the mixture and firing the mixture at a temperature and for a time sufficient to form the phosphor.

DESCRIPTION OF THE PREFERRED EMBODIMENTS

For a better understanding of the present invention, together with other and further objects, advantages and capabilities thereof, reference is made to the following disclosure and appended claims.

We have discovered that the addition of tungsten to monoclinic M' yttrium tantalate x-ray phosphors substantially reduces the persistence of these phosphors. In particular, activated and unactivated monoclinic M' yttrium tantalate x-ray phosphors have been made to contain a small amount of tungsten. These phosphors exhibit a substantially reduced level of persistence as compared to the same phosphor prepared without the tungsten additive. Preferably, the tungsten additive reduces persistence by at least about 10 percent and more preferably by at least about 25 percent. In general, the amount of tungsten in the phosphor should be at least about 4 ppm, although lower amounts may also be effective. A preferred range for the amount of tungsten in the phosphor is from about 4 ppm to about 500 ppm and more preferably from about 10 ppm to about 100 ppm.

In one embodiment, the yttrium tantalate phosphors may be represented by the general formula:

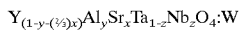

where $0 \leq x \leq 0.20$, $0 \leq y \leq 0.10$, and $0 \leq z \leq 0.20$. Unless otherwise indicated, the amounts of the tungsten additive and other activators described herein are formulated amounts. The actual amounts of these elements in the resulting phosphor may be less depending on the starting materials and process used to produce the phosphor. Given the description of the invention contained herein, it is anticipated that one skilled in the art using conventional techniques can readily determine the amounts of these compounds necessary to produce phosphors containing the desired additive/activator quantities. Amounts are given on a weight basis, either in weight percent (wt. %) or parts per million (ppm) unless otherwise indicated. Phosphor compositional formulas are given on a mole basis.

The tungsten additive is incorporated into the phosphor by either adding sodium tungstate, $Na_2WO_4$, to the $LiSO_4$-$NaSO_4$ flux, or adding tungsten trioxide, $WO_3$, directly into the oxide mixture. Preferably, the amount of sodium tungstate added to the flux mixture is from about $1 \times 10^{-6}$ to about 5 weight percent of the total mixture. More preferably, the amount of $Na_2WO_4$ ranges from about 0.01 to about 1.0 wt. % of the total mixture. The preferred amount of $WO_3$ added to the oxide mixture is from about 1 ppm to about 500 ppm of the total mixture. More preferably, the amount of $WO_3$ added ranges from about 4 ppm to 40 ppm of the mixture. Other tungsten containing compounds which do not volatize immediately when heated to the phosphor firing temperature should also be useable as the source of the tungsten additive, e.g., tungsten containing alkali and alkaline earth metal salts, and other tungstates and tungsten oxides. Aluminum and niobium may be added to increase x-ray optical fluorescence (XOF) brightness.

The tungsten additive reduced the persistence of the yttrium tantalate phosphors with and without the additional presence of a $Sr^{2+}$ species. This is especially important because, although strontium will also decrease persistence and increase XOF brightness, the use of strontium in unactivated yttrium tantalate x-ray phosphors also enhances the phosphor's blue emission centered around 405 nm. This elevated blue emission is believed to have a negative impact on x-ray image resolution.

The following non-limiting examples are presented.

Monoclinic M' yttrium tantalate phosphors having the general formulas, $Y_{1-x}Sr_xTaO_4$:W ($0 \leq x \leq 0.02$) and $YAl_{0.02}Sr_{0.02}TaO_4$:(Nb,W) were made using variable amounts of tungsten and niobium. Persistence as measured herein was the ratio of the XOF brightness 30 seconds after x-ray excitation ceased to the XOF brightness during continuous x-ray excitation. Brightness and persistence measurements were made using an x-ray generator operating at 80 kV (Mo anode) in combination with a scanning spectrometer.

EXAMPLES 1–9

$Y_{1-x}Sr_xTaO_4$:W Phosphors

The specific amounts of materials used in these examples are given in Table 1. Yttrium oxide, $Y_2O_3$, tantalum pentoxide, $Ta_2O_5$, and strontium carbonate, $SrCO_3$, were weighed into 16 ounce glass bottles and intimately mixed by shaking the material on a paint shaker for 20 minutes. Sodium tungstate (−140 mesh), $Na_2WO_4$, and pulverized flux materials lithium sulfate (−140 mesh), $Li_2SO_4$, and sodium sulfate, $Na_2SO_4$, were then weighed and added to the oxide mixtures. (A $Li_2SO_4/Na_2SO_4$ flux was used in Examples 2–5. The other examples used a $Li_2SO_4$ flux.) After the mixtures were reblended again on the paint shaker for 20 minutes, 2 mm yttria stabilized zirconia beads were added in an amount equal to approximately twice the weight of the total mixture and the mixtures were blended on a roll mixer for 60 minutes. The beads were separated from the mixtures and the mixtures were loaded into 100 ml prefired alumina crucibles. The crucibles were placed into an electric furnace at about 800° C. and the temperature of the furnace was increased slowly to about 1200–1290° C. over a 6 hour time period. After firing the mixtures at about 1200–1290° C. for 12 hours, the furnace was allowed to cool to about 800° C. as fast as possible with the door closed. The crucibles were removed and allowed to cool to room temperature. The cooled, fired cakes were placed in 4 liter plastic beakers and soaked with deionized water. The phosphor samples were washed many times with deionized water until free of flux material and unreacted sodium tungstate. The phosphor was filtered, dried overnight at 120° C., sifted through a −325 mesh, and coated with 0.02 wt. % of colloidal silica (M-5 Cab-O-Sil manufactured by Cabot Corporation). Samples were submitted for x-ray optical fluorescence (XOF) brightness and persistence measurements. Brightness and persistence were measured relative to a standard yttrium tantalate phosphor. The presence of the monoclinic M' $YTaO_4$ phase was confirmed by x-ray diffraction. The optical properties of these phosphors are given in Table 3.

EXAMPLES 10–15

$YSr_{0.02}Al_{0.02}TaO_4$:(Nb,W) Phosphors

These phosphors were prepared similarly to the phosphors in Examples 1–9. Aluminum oxide, $Al_2O_3$, and niobium pentoxide, $Nb_2O_5$, were added to the oxide mixture. Tungsten trioxide, $WO_3$, replaced $Na_2WO_4$ as the source of the tungsten additive and was added directly to the oxide mixture instead of the flux. The specific amounts of each material are given in Table 2. The measured optical properties are presented in Table 4.

TABLE 1

Examples of $Y_{1-x}Sr_xTaO_4$: W formulations by $Na_2WO_4$ addition

| Example No. | $Y_2O_3$ | $Ta_2O_5$ | $SrCO_3$ | $Li_2SO_4$ | $Na_2SO_4$ | $Na_2WO_4$ | wt. % $Na_2WO_4$ |
|---|---|---|---|---|---|---|---|
| control | 35.77 g | 70.00 g | 0.0 g | 29.7 g | — | 0.0 g | 0.0% |
| 1 | 35.77 g | 70.00 g | 0.0 g | 29.7 g | — | 0.212g | 0.16% |
| control | 50.62 g | 99.65 g | 0.133g | 40.0 g | 0.0 g | 0.0 g | 0.0% |
| 2 | 50.62 g | 99.65 g | 0.133g | 28.6 g | 11.4 g | 0.19 g | 0.10% |
| 3 | 50.62 g | 99.65 g | 0.133g | 28.6 g | 11.4 g | 0.38 g | 0.20% |
| 4 | 50.62 g | 99.65 g | 0.133g | 28.6 g | 11.4 g | 0.75 g | 0.39% |
| 5 | 50.62 g | 99.65 g | 0.133g | 28.6 g | 11.4 g | 1.50 g | 0.79% |
| control | 35.06 g | 70.00 g | 0.935g | 29.7 g | — | 0.0 g | 0.0% |
| 6 | 35.06 g | 70.00 g | 0.935g | 29.7 g | — | 0.212g | 0.16% |
| control | 45.07 g | 90.00 g | 1.203g | 38.2 g | — | 0.0 g | 0.0% |
| 7 | 45.07 g | 90.00 g | 1.203g | 38.2 g | — | 0.135g | 0.08% |
| 8 | 45.07 g | 90.00 g | 1.203g | 38.2 g | — | 0.270g | 0.16% |
| 9 | 45.07 g | 90.00 g | 1.203g | 38.2 g | — | 0.540g | 0.31% |

TABLE 2

Examples of $YAl_{0.02}Sr_{0.02}TaO_4$: (Nb, W) formulations by $WO_3$ addition

| Example No. | $Y_2O_3$ | $Ta_2O_5$ | $Al_2O_3$ | $SrCO_3$ | $Nb_2O_5$ | $WO_3$ | $Li_2SO_4$ |
|---|---|---|---|---|---|---|---|
| Control | 383.4 g | 750 g | 3.46 g | 10.03 g | 0 g | 0 g | 312.0 g |
| 10 | 383.4 g | 750 g | 3.46 g | 10.03 g | 0.017 g | 0.0145 g | 312.0 g |
| 11 | 383.4 g | 750 g | 3.46 g | 10.03 g | 0.017 g | 0.056 g | 312.0 g |
| 12 | 383.4 g | 750 g | 3.46 g | 10.03 g | 0.041 g | 0.0055 g | 312.0 g |
| 13 | 383.4 g | 750 g | 3.46 g | 10.03 g | 0.041 g | 0.036 g | 312.0 g |

TABLE 2-continued

Examples of $YAl_{0.02}Sr_{0.02}TaO_4$: (Nb, W) formulations by $WO_3$ addition

| Example No. | $Y_2O_3$ | $Ta_2O_5$ | $Al_2O_3$ | $SrCO_3$ | $Nb_2O_5$ | $WO_3$ | $Li_2SO_4$ |
|---|---|---|---|---|---|---|---|
| 14 | 383.4 g | 750 g | 3.46 g | 10.03 g | 0.066 g | 0.0145 g | 312.0 g |
| 15 | 383.4 g | 750 g | 3.46 g | 10.03 g | 0.066 g | 0.058 g | 312.0 g |

TABLE 3

Optical Properties of $Y_{1-x}Sr_xTaO_4$:W Phosphors

| Example No. | Sr amount (x) | $Na_2WO_4$ wt. % | Rel. XOF brightness | XOF persistence |
|---|---|---|---|---|
| control | 0.0 | 0.0 | 0.85 | $96.0 \times 10^{-4}$ |
| 1 | 0.0 | 0.16 | 0.79 | $2.10 \times 10^{-4}$ |
| control | 0.002 | 0.0 | 1.00 | $14.0 \times 10^{-4}$ |
| 2 | 0.002 | 0.10 | 0.94 | $0.35 \times 10^{-4}$ |
| 3 | 0.002 | 0.20 | 0.92 | $0.05 \times 10^{-4}$ |
| 4 | 0.002 | 0.39 | 0.88 | $0.02 \times 10^{-4}$ |
| 5 | 0.002 | 0.79 | 0.85 | $0.04 \times 10^{-4}$ |
| control | 0.02 | 0.0 | 1.00 | $1.20 \times 10^{-4}$ |
| 6 | 0.02 | 0.16 | 0.92 | $0.36 \times 10^{-4}$ |
| control | 0.02 | 0.0 | 1.00 | $1.20 \times 10^{-4}$ |
| 7 | 0.02 | 0.08 | 1.02 | $0.91 \times 10^{-4}$ |
| 8 | 0.02 | 0.16 | 1.03 | $0.50 \times 10^{-4}$ |
| 9 | 0.02 | 0.31 | 0.94 | $0.37 \times 10^{-4}$ |

TABLE 4

Optical Properties of $YAl_{0.02}Sr_{0.02}TaO_4$: (Nb,W) Phosphors

| Example No. | Nb ppm | W ppm | Rel. XOF brightness | XOF persistence |
|---|---|---|---|---|
| Control | 0 | 0 | 1.00 | $0.59 \times 10^{-4}$ |
| 10 | 10 | 10 | 1.10 | $0.27 \times 10^{-4}$ |
| 11 | 10 | 40 | 1.19 | $0.28 \times 10^{-4}$ |
| 12 | 25 | 3.8 | 1.23 | $0.50 \times 10^{-4}$ |
| 13 | 25 | 25 | 1.10 | $0.33 \times 10^{-4}$ |
| 14 | 40 | 10 | 1.32 | $2.50 \times 10^{-4}$ |
| 15 | 40 | 40 | 1.35 | $1.80 \times 10^{-4}$ |

The data presented in Tables 3 and 4 demonstrate that the addition of tungsten to yttrium tantalate x-ray phosphors dramatically reduces their persistence. For examples 1–5, the reduction in persistence as compared to the control is at least about 98%. In examples 1–9, the XOF brightness of these phosphors is either not affected or slightly lowered depending upon the amount of $Na_2WO_4$ added.

The data for examples 10–15 also demonstrate decreasing persistence with increasing amounts of tungsten. The addition of niobium to the yttrium tantalate phosphors increased the phosphor's persistence and XOF brightness (e.g., Example 10 (10 ppm Nb, 10 ppm W) vs. Example 14 (40 ppm Nb, 10 ppm W). Increasing further the amount of $WO_3$ added to the phosphor formulations increased XOF brightness and/or decreased XOF persistence.

The phosphors in examples 2–6 were analyzed by Glow Discharge Mass Spectrometry (GDMS). The results of the analysis are given in Table 5. The data show that tungsten has been incorporated into the phosphors and that increasing amounts of tungsten cause a corresponding decrease in the measured persistence. The results also show that a small amount of sodium has been incorporated into the phosphor. However, the amount of sodium present appears to have no effect on the level of persistence. Not all of the tungsten added as sodium tungstate was incorporated into the phosphor. However, one skilled in the art can empirically determine the necessary amount of the tungsten containing compound to be added to the mixture of raw materials formulated to make the phosphor in order to achieve the desired level of tungsten in the phosphor.

TABLE 5

GDMS Analysis of $Y_{1-x}Sr_xTaO_4$:W Phosphors

| Example No. | Amount of $Na_2WO_4$ added to flux (wt. %) | analyzed W amount (ppm) | analyzed Na amount (ppm) | XOF persistence |
|---|---|---|---|---|
| control | 0.0 | 0.3 | 1.0 | $14.0 \times 10^{-4}$ |
| 2 | 0.10 | 27 | 8.2 | $0.35 \times 10^{-4}$ |
| 3 | 0.20 | 45 | 14 | $0.05 \times 10^{-4}$ |
| 4 | 0.39 | 54 | 14 | $0.02 \times 10^{-4}$ |
| 5 | 0.79 | 73 | 7.4 | $0.04 \times 10^{-4}$ |
| control | 0.0 | 4.1 | 2.2 | $1.20 \times 10^{-4}$ |
| 6 | 0.16 | 31 | 5.5 | $0.36 \times 10^{-4}$ |

EXAMPLES 16 and 17

$Y_{0.98}Sr_{0.02}TaO_4$:W Phosphors

These phosphors were made similarly to Examples 10–15. The specific amounts of raw materials used are given in Table 6. Optical data for these examples is presented in Table 7.

TABLE 6

$Y_{0.98}Sr_{0.02}TaO_4$:W phosphors by $WO_3$ addition

| Example No. | $Y_2O_3$ | $Ta_2O_5$ | $SrCO_3$ | $Li_2SO_4$ | $WO_3$ |
|---|---|---|---|---|---|
| control | 44.26 g | 88.38 g | 1.181 g | 37.50 g | 0.0 g |
| 16 | 44.26 g | 88.38 g | 1.181 g | 37.50 g | 0.00337 g |
| 17 | 44.25 g | 88.38 g | 1.181 g | 37.50 g | 0.00675 g |

TABLE 7

Optical Properties of $Y_{0.98}Sr_{0.02}TaO_4$:W phosphors

| Example No. | W ppm | Rel. XOF brightness | XOF persistence |
|---|---|---|---|
| control | 0 | 1.00 | $0.71 \times 10^{-4}$ |
| 16 | 20 | 1.00 | $0.28 \times 10^{-4}$ |
| 17 | 40 | 1.00 | $0.20 \times 10^{-4}$ |

Again, the data in Table 7 demonstrates the ability of tungsten to reduce persistence in yttrium tantalate phosphors. The data also shows that there was no loss of brightness over the range of tungsten concentrations tested.

While there has been shown and described what are at the present considered the preferred embodiments of the invention, it will be obvious to those skilled in the art that various changes and modifications may be made therein without departing from the scope of the invention as defined by the appended claims.

We claim:

1. A monoclinic M' yttrium tantalate x-ray phosphor having an amount of tungsten to reduce persistence.

2. The phosphor of claim 1 wherein the amount of tungsten is at least about 4 ppm.

3. The phosphor of claim 1 wherein the amount of tungsten is from about 4 ppm to about 500 ppm.

4. The phosphor of claim 1 wherein the amount of tungsten is from about 10 ppm to about 100 ppm.

5. The phosphor of claim 1 wherein the phosphor has a general formula $Y_{1-x}Sr_xTaO_4$: W where $0 \leq x \leq 0.02$.

6. The phosphor of claim 5 wherein the amount of tungsten is at least about 4 ppm.

7. The phosphor of claim 5 wherein the amount of tungsten is from about 4 ppm to about 500 ppm.

8. The phosphor of claim 5 wherein the amount of tungsten is from about 10 ppm to about 100 ppm.

9. The phosphor of claim 1 wherein the phosphor has the general formula $YAl_{0.02}Sr_{0.02}TaO_4$:(Nb,W).

10. The phosphor of claim 9 wherein the phosphor contains from 10 ppm to 40 ppm niobium.

11. The phosphor of claim 10 wherein the phosphor contains from about 4 ppm to 40 ppm tungsten.

12. The phosphor of claim 1 wherein the persistence is reduced by at least about 10 percent.

13. The phosphor of claim 1 wherein the persistence is reduced by at least about 25 percent.

14. The phosphor of claim 1 wherein the phosphor has a general formula $Y_{(1-y-(2/3)x)}Al_ySr_xTa_{1-z}Nb_zO_4$:W where $0 \leq x \leq 0.20$, $0 \leq y \leq 0.10$, $0 \leq z \leq 0.20$, and the amount of tungsten is at least 4 ppm by weight.

15. The phosphor of claim 14 wherein the amount of tungsten is from about 4 ppm to about 500 ppm.

16. The phosphor of claim 15 wherein the amount of tungsten is from about 10 ppm to about 100 ppm.

17. A method for reducing the persistence of monoclinic M' yttrium tantalate x-ray phosphors comprising incorporating a tungsten additive into the phosphor.

18. The method of claim 17 wherein the tungsten additive is incorporated into the phosphor by making a mixture of raw materials formulated to make the phosphor, adding an amount of a tungsten containing compound to the mixture and firing the mixture at a temperature and for a time sufficient to form the phosphor.

19. The method of claim 18 wherein the amount of the tungsten containing compound added to the mixture is sufficient to yield a tungsten concentration of at least about 4 ppm in the phosphor.

20. The method of claim 18 wherein the amount of the tungsten containing compound added to the mixture is sufficient to yield a tungsten concentration from about 4 ppm to about 500 ppm in the phosphor.

21. The method of claim 18 wherein the amount of the tungsten containing compound added to the mixture is sufficient to yield a tungsten concentration from about 10 ppm to about 100 ppm in the phosphor.

22. The method of claim 18 wherein the tungsten containing compound is sodium tungstate.

23. The method of claim 22 wherein the amount of sodium tungstate comprises from about $1 \times 10^{-6}$ to about 5 weight percent of the mixture.

24. The method of claim 22 wherein the amount of sodium tungstate comprises from about 0.01 to about 1.0 weight percent of the mixture.

25. The method of claim 18 wherein the tungsten containing compound is tungsten trioxide.

26. The method of claim 25 wherein the amount of tungsten trioxide comprises from about 1 ppm to about 500 ppm of the mixture.

27. The method of claim 25 wherein the amount of tungsten trioxide comprises from about 4 ppm to about 40 ppm of the mixture.

* * * * *